Jan. 24, 1967  A. KUDOLA, JR  3,299,948
COOLING DEVICE HAVING A PLURALITY OF ANNULAR PARALLEL DISCS
FORMING COMPARTMENTS ADJACENT THE HEATED ELEMENT
Filed Feb. 27, 1962
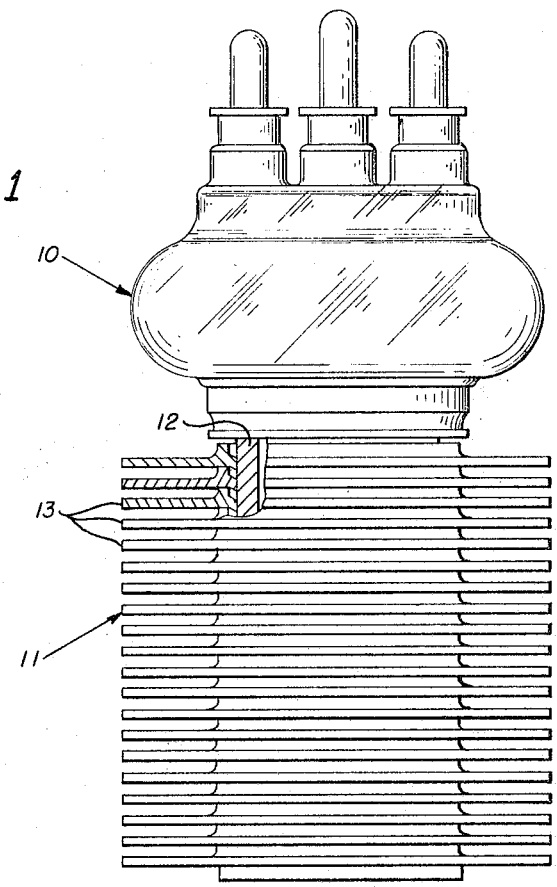
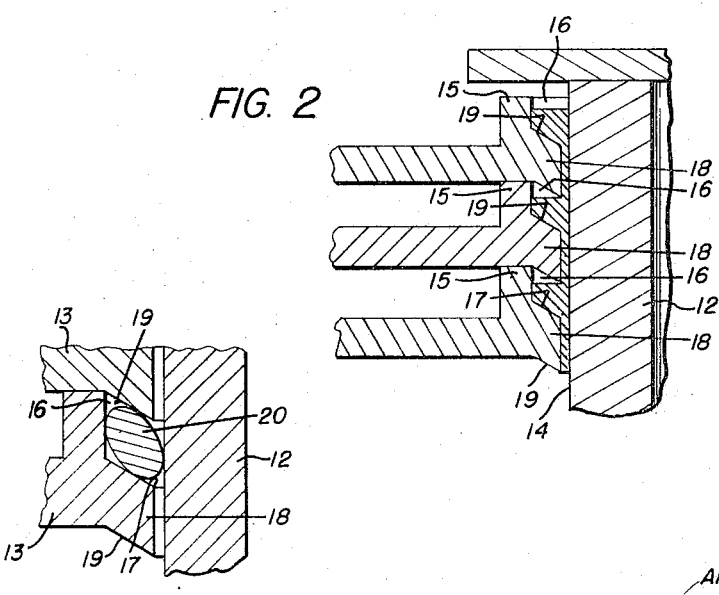
INVENTOR
ANDREW KUDOLA, JR.
BY
AGENT United States Patent Office 3,299,948
Patented Jan. 24, 1967

3,299,948
COOLING DEVICE HAVING A PLURALITY OF ANNULAR PARALLEL DISCS FORMING COMPARTMENTS ADJACENT THE HEATED ELEMENT
Andrew Kudola, Jr., Stamford, Conn., assignor to Machlett Laboratories, Incorporated, Springdale, Conn., a corporation of Connecticut
Filed Feb. 27, 1962, Ser. No. 176,012
6 Claims. (Cl. 165—185)

This invention relates to cooling or heat exchange systems for use with thermionic discharge devices and has particular reference to finned radiators attached to anodes of electron tubes.

In the electron tube manufacturing industry it is desirable and common, particularly in the manufacture of high powered electron tubes, to provide cooling means such as finned radiators for removing heat from external anodes or other parts of a device which generate or are subjected to heat during operation of the device. The most common method for accomplishing this is to attach to the anode, or other heated element, a radiator having a plurality of closely fitting radially extending copper fins arranged in predetermined spaced relation throughout substantially the entire length of the exposed surface of the heated element, and to force cool air or other fluid coolant between the fins to dissipate the heat. It has generally been the practice in the manufacture of electron tubes to initially braze the fins to a copper sleeve or core to the radiator and to subsequently solder the sleeve in encircling relation to the anode in a separate assembling operation.

There are, however, a number of objections to such prior art radiators, among them being the poor heat conductive junction between the radiator and the anode which prevents uniform distribution of heat outwardly to the fins. This often results in the development of hot spots on the anode.

Attempts to overcome this problem have been made by soldering or brazing individual fins to the anode without the use of a sleeve or core. This necessitated the use of special jigs and fixtures for maintaining the fins in proper spaced relation. However, here again non-uniform heat distribution resulted unless heat-conveying annular spacers were located between the fins and also brazed or soldered to the anode. The soldering operation thus became even more involved and the problem of unequal thermal expansion of the fins and spacers became an undesirable factor.

The present invention overcomes the foregoing and other disadvantages of the prior art by embodying a radiator structure which employs a plurality of fins soldered or brazed directly to an anode in spaced relation with one another as required for proper flow of fluid coolant, which spacing is controlled by annular protuberances or flanges on each fin upon which adjacent fins repose, the protuberances additionally serving to provide one wall of an annular well or compartment for restricting the flow of solder material, thus permitting a solid unbroken junction to be formed between the assembled fins and anode.

Accordingly it is a primary object of this invention to provide an improved radiator structure for electron discharge devices.

Another object is to provide a radiator which is comprised of a plurality of fins shaped to interfit with an object to be cooled, such as an anode, and having means thereon for providing controlled relatively uniform spacing between fins and simultaneously restricting flow of solder or brazing material to desired areas of the structure.

Another object is to provide a radiator having a substantially solid, continuous, heat-conductive junction with the article to be cooled.

Other objects and advantages of this invention will become apparent from the following description taken in connection with the accompanying drawing, wherein FIG. 1 is an elevational view partly in section illustrating an electron tube having a radiator embodying the invention;

FIG. 2 is an enlarged view of the sectioned area of FIG. 1; and

FIG. 3 is a greatly enlarged sectional view of a joint between two spacers and an anode.

Referring more patricularly to the drawing, wherein like characters of references designate like parts throughout the several views, an electron tube 10 is depicted in FIG. 1 as an object to which is applied a radiator 11 embodying the invention. The tube 10 is not described in detail herein except insofar as is necessary to point out that it embodies an anode 12 which, during operation of the device, is subjected to considerable heat which must be dissipated in order to produce efficient operational results.

Anode 12 is generally a hollow cylindrical member, the exposed surface of which may be located either internally or externally of other portions of the tube structure, and which is shown in FIG. 1 as a downwardly extending external member upon the exposed cylindrical outer surface of which is disposed radiator 11.

It is important that the greatest possible area of close contact be provided between the anode 12 and radiator 11 to permit maximum dissipation of heat from the anode to the radiator. In order to accomplish this, the presently described radiator is comprised of a plurality of radially extending annular fins 13 which are mounted in encircling relation to the anode 12 with their inner peripheral surfaces in relatively close relation with the outer surface 14 (FIG. 2) of the anode. The size of the spaces between the fins and the anode may vary slightly from fin to fin but is preferably such as to permit ready assembly of the fins with the anode without excessive sloppiness in the fit.

Each fin 13 is a flat disc-like member of copper or other selected heat-conductive material, preferably a material having thermal expansion characteristics which are similar to the expansion characteristics of the anode. The fins 13 are all made to a desired outer diameter and are arranged on the anode in spaced relation to each other to permit the flow of cool air or other fluid coolant between the fins.

In accordance with this invention, the spacing between fine 13 is controlled by annular flanges or protuberances 15 which are formed one on the upper surface of each fin and slightly spaced from the inner peripheral edge of the central opening which receives the anode. Each flange 15 extends upwardly, generally normal to the plane of its respective fin, toward the adjacent lower surface of the next succeeding fin for a distance which is in accordance with the desired spacing between fins. The fins are thus stacked upon one another in this manner to form the radiator 11.

As noted above, the flanges 15 are spaced from the inner peripheries of the respective fins and thus, in addition to controlling the spacing between fins, also provide one wall of respective annular openings or compartments 16 which are further defined by the upper surface 17 of the extreme inner annular edge portion 18 of the fin, the outer wall of the anode, and the lower surface 19 of the edge portion 18 of the next higher fin. Each annular compartment 16 is of a size to receive a ring 20 (FIG. 3) of solder wire or brazing material such as cadmium, silver, or other selected material, preferably one which has thermal expansion characteristics generally similar to the anode or fins. Such material is hereinafter referred to as solder material, but this term is intended to include brazing or other material useful in fixedly joining metal parts. A solder ring 20 is adapted to be placed within each annular compartment 16, as shown in FIG. 3, during assembly of the radiator prior to affixing the radiator to the anode.

Since it is desired that a substantially continuous brazed or soldered junction be made between the radiator and anode throughout the overlying lengths thereof, means is provided for insuring flow of melted solder material into the small spaces between the anode and the inner peripheral edges of the fins. This is accomplished by inclining downwardly the inner annular edge portions 18 of each fin as shown in FIGS. 2 and 3. This provides the surfaces 17 with downward inclinations whereby melted solder, resulting from heating the rings 20, will flow downwardly into the small spaces between the fins and the anode, as shown in FIG. 2.

The size of the solder wire may be controlled so that when the assembly is completed, solder will occupy the entire space in each compartment 16 at least from the lower edge of each under surface 19 of a fin to the lower edge of the upper surface 17 of the next lower fin. Additionally, solder will also occupy the entire space between each fin and the adjacent wall of the anode. Thus, a continuous solder junction is provided throughout substantially the length of the radiator. In this way, improved efficient conduction of heat from the anode into the fins is provided which aids in efficient cooling of the anode and reduction or elimination of hot spots.

From the foregoing it wil be aparent that the objects and advantages of this invention have been achieved by the provision of the described cooling device embodying stacked fins having novel "built-in" spacing means and means for controlling the flow of solder or brazing material whereby an improved heat-conductive junction is formed between the cooling device and the article to be cooled.

It is to be understood that various modifications and changes in the device shown and described may be made by those skilled in the art without departing from the spirit of the invention as expressed in the accompanying claims. Therefore, it is to be understood that all matter shown and described is to be interpreted as illustrative and not in a limiting sense.

What is claimed is:

1. A device for cooling a heated element comprising a radiator embodying a plurality of substantially parallel annular discs located in substantially concentric relation around the heated element, the inner peripheral edges of the discs being affixed to the surface of the element, the discs each having an annular flange on one side thereof in abutment with an adjacent disc whereby said discs are spaced apart from receiving fluid coolant therebetween, said flanges each being outwardly spaced from the inner peripheral edge of its respective disc providing an annular compartment adjacent the surface of the heated element and between the respective disc and the adjacent disc, and brazing material in each compartment occupying the space therein and between the inner peripheral edge of the disc and the adjacent surface of the heated element whereby there is provided a continuous seal throughout substantially the length of the radiator.

2. A radiator for cooling an anode of an electron discharge device, said radiator comprising a plurality of substantially parallel annular discs located in substantial concentric relation with their inner peripheral edges affixed to the anode, the discs each having an annular flange on one side thereof in abutment with an adjacent disc whereby said discs are spaced apart from receiving fluid coolant therebetween, said flanges each being outwardly spaced from the inner peripheral edge of its respective disc providing an annular compartment adjacent the surface of the anode and between the respective disc and the adjacent disc, and brazing material in each compartment occupying the space therein and between the inner peripheral edge of the disc and the adjacent surface of the anode whereby there is provided a continuous seal throughout substantially the length of the radiator.

3. An electron discharge device comprising an envelope having an anode at one end thereof, and cooling means for said anode comprising a plurality of substantially parallel annular discs located in substantially concentric relation with their inner peripheral edges affixed to the anode, the discs each having an annular flange on one side thereof in abutment with an adjacent disc whereby said discs are spaced apart for receiving fluid coolant therebetween, said flanges each being outwardly spaced from the inner peripheral edge of its respective disc providing an annular compartment adjacent the surface of the anode and between the respective disc and the adjacent disc, and brazing material in each compartment occupying the space therein and between the inner peripheral edge of the disc and the adjacent surface of the anode whereby there is provided a continuous seal throughout substantially the length of the radiator.

4. A device substantially as set forth in claim 1 wherein the portion of each disc which is disposed inwardly of the respective flange has its upper surface inclined downwardly in the direction of the heated element whereby brazing material will flow into the spaces between the inner peripheral edges of the discs and the element.

5. A device substantially as set forth in claim 2 wherein the portion of each disc which is disposed inwardly of the respective flange has its upper surface inclined downwardly in the direction of the anode whereby brazing material will flow into the spaces between the inner peripheral edges of the discs and the anode.

6. A device substantially as set forth in claim 3 wherein the portion of each disc which is disposed inwardly of thte respective flange has its upper surface inclined downwardly in the direction of the anode whereby brazing material will flow into the spaces between the inner peripheral edges of the discs and the anode.

References Cited by the Examiner

UNITED STATES PATENTS

| | | | |
|---|---|---|---|
| 1,865,051 | 6/1932 | Trane | 165—182 X |
| 1,960,955 | 5/1934 | Recker | 29—157.3 X |
| 2,450,130 | 9/1948 | Jordon et al. | 313—45 X |
| 2,770,745 | 11/1956 | Manfredi | 313—36 X |

HERMAN KARL SAALBACH, *Primary Examiner.*

GEORGE N. WESTBY, *Examiner.*

S. CHATMON, JR., *Assistant Examiner.*